US012054420B2

United States Patent
Beutier et al.

(10) Patent No.: US 12,054,420 B2
(45) Date of Patent: Aug. 6, 2024

(54) SUBSTRATE PROVIDED WITH A STACK HAVING THERMAL PROPERTIES AND AN ABSORBENT LAYER

(71) Applicant: SAINT-GOBAIN GLASS FRANCE, Courbevoie (FR)

(72) Inventors: Julien Beutier, Paris (FR); Véronique Rondeau, Asnieres sur Seine (FR); Estelle Martin, Saint-Denis (FR); Soumyadeep Misra, Chennai (IN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 172 days.

(21) Appl. No.: 17/426,929

(22) PCT Filed: Jan. 30, 2020

(86) PCT No.: PCT/FR2020/050150
§ 371 (c)(1),
(2) Date: Jul. 29, 2021

(87) PCT Pub. No.: WO2020/157440
PCT Pub. Date: Aug. 6, 2020

(65) Prior Publication Data
US 2022/0098095 A1 Mar. 31, 2022

(30) Foreign Application Priority Data
Jan. 30, 2019 (FR) ...................................... 1900878

(51) Int. Cl.
*C03C 17/36* (2006.01)
*E06B 3/67* (2006.01)
*E06B 9/24* (2006.01)

(52) U.S. Cl.
CPC ........ *C03C 17/366* (2013.01); *C03C 17/3626* (2013.01); *C03C 17/3642* (2013.01); *C03C 17/3644* (2013.01); *C03C 17/3649* (2013.01); *C03C 17/3681* (2013.01); *E06B 3/6715* (2013.01); *E06B 9/24* (2013.01); *C03C 2217/212* (2013.01); *C03C 2217/216* (2013.01); *C03C 2217/256* (2013.01); *C03C 2217/261* (2013.01); *C03C 2217/281* (2013.01); *C03C 2217/734* (2013.01); *C03C 2218/156* (2013.01); *E06B 2009/2417* (2013.01)

(58) Field of Classification Search
CPC ............ C03C 17/366; C03C 17/3644; C03C 17/3647; C03C 17/3681; C03C 17/3639; C03C 17/3649; B32B 17/1022; B32B 17/10229; G02B 5/208; G02B 5/281; G02B 5/282; G02B 5/285
See application file for complete search history.

(56) References Cited

U.S. PATENT DOCUMENTS

| 2003/0104221 | A1  |    6/2003 | Stachowiak |              |
|--------------|-----|-----------|------------|--------------|
| 2006/0246300 | A1* | 11/2006   | Hevesi     | C03C 17/3689 |
|              |     |           |            | 428/432      |
| 2008/0070045 | A1* |  3/2008   | Barton     | C03C 17/36   |
|              |     |           |            | 428/411.1    |
| 2009/0068447 | A1* |  3/2009   | Blacker    | C03C 17/3626 |
|              |     |           |            | 428/432      |
| 2011/0262726 | A1* | 10/2011   | Knoll      | C03C 17/36   |
|              |     |           |            | 428/428      |
| 2011/0305853 | A1* | 12/2011   | Reymond    | C03C 17/3681 |
|              |     |           |            | 427/160      |
| 2012/0225317 | A1* |  9/2012   | Imran      | C22C 19/053  |
|              |     |           |            | 427/160      |
| 2013/0057951 | A1* |  3/2013   | Hevesi     | C03C 17/36   |
|              |     |           |            | 359/359      |
| 2014/0072784 | A1* |  3/2014   | Dietrich   | C03C 17/3639 |
|              |     |           |            | 428/428      |
| 2014/0362434 | A1  | 12/2014   | Schmitz et al. | |
| 2016/0023942 | A1* |  1/2016   | Mahieu     | C03C 17/3639 |
|              |     |           |            | 428/433      |
| 2016/0031751 | A1* |  2/2016   | Mahieu     | C03C 17/3642 |
|              |     |           |            | 428/428      |
| 2016/0145151 | A1* |  5/2016   | Mahieu     | C03C 17/3649 |
|              |     |           |            | 428/213      |
| 2016/0257611 | A1* |  9/2016   | Noethe     | C03C 17/3644 |
| 2018/0187477 | A1* |  7/2018   | Tucker     | C03C 17/366  |
| 2019/0185374 | A1* |  6/2019   | Kwon       | G02B 5/208   |
| 2019/0382306 | A1* | 12/2019   | Biswas     | C03C 17/3435 |

(Continued)

FOREIGN PATENT DOCUMENTS

| CN | 106746733 A | * | 5/2017 |
| EP | 0 844 219 A1 |   | 5/1998 |

(Continued)

OTHER PUBLICATIONS

Machine translation of CN-106746733-A.*

(Continued)

*Primary Examiner* — Z. Jim Yang

(74) *Attorney, Agent, or Firm* — Pillsbury Winthrop Shaw Pittman LLP

(57) ABSTRACT

A substrate coated on one of its faces with a stack of thin layers having reflection properties in the infrared and/or in solar radiation, including two metallic functional layers, in particular on the basis of silver. Each of the metallic functional layers is disposed between two dielectric coatings. The coating includes at least two absorbent layers which absorb solar radiation in the visible part of the spectrum, which is disposed at least in two different dielectric coatings.

15 Claims, No Drawings

(56) References Cited

U.S. PATENT DOCUMENTS

| | | | |
|---|---|---|---|
| 2020/0189972 A1* | 6/2020 | Park | C03C 17/366 |
| 2020/0369561 A1* | 11/2020 | Misra | C03C 17/36 |
| 2021/0221734 A1* | 7/2021 | Ongarello | C03C 17/3618 |

FOREIGN PATENT DOCUMENTS

| | | | | |
|---|---|---|---|---|
| EP | 0 847 965 A1 | 6/1998 | | |
| EP | 1 341 732 B1 | 12/2007 | | |
| EP | 1 881 893 B1 | 7/2018 | | |
| EP | 3 505 715 A1 | 7/2019 | | |
| JP | 2008-540320 A | 11/2008 | | |
| JP | 2012-529419 A | 11/2012 | | |
| JP | 2013-532306 A | 8/2013 | | |
| JP | 2015-529187 A | 10/2015 | | |
| JP | 2015-533761 A | 11/2015 | | |
| WO | WO 2010/142926 A1 | 12/2010 | | |
| WO | WO 2014/ 039345 A2 | 3/2014 | | |
| WO | WO 2014/039349 A2 | 3/2014 | | |
| WO | WO 2015/155444 A1 | 10/2015 | | |
| WO | WO 2017/006029 A1 | 1/2017 | | |
| WO | WO 2018/038329 A1 | 3/2018 | | |
| WO | WO-2018109534 A1 * | 6/2018 | | C03C 17/3423 |
| WO | WO-2021019259 A1 * | 2/2021 | | C03C 17/36 |

OTHER PUBLICATIONS

International Search Report as issued in International Patent Application No. PCT/FR2020/050150, dated May 28, 2020.
Office Action as issued in Japanese Patent Application No. 2021-544147, dated Oct. 31, 2023.

* cited by examiner

SUBSTRATE PROVIDED WITH A STACK HAVING THERMAL PROPERTIES AND AN ABSORBENT LAYER

CROSS-REFERENCE TO RELATED APPLICATIONS

This application is the U.S. National Stage of PCT/FR2020/050150, filed Jan. 30, 2020, which in turn claims priority to French patent application number 1900878 filed Jan. 30, 2019. The content of these applications are incorporated herein by reference in their entireties.

The invention relates to transparent substrates, in particular made of rigid mineral material such as glass (or an organic material such as a polymer substrate, which can be rigid or flexible), said substrates being coated with a stack of thin layers comprising at least one layer with metallic behavior which can act on solar radiation and/or long-wave infrared radiation.

The invention relates more specifically to the use of such substrates for manufacturing thermal insulation glazings and/or solar protection glazings. These glazings are intended equally for installation in buildings and in vehicles. They aim in particular to reduce the air-conditioning effort and/or to reduce excessive overheating (so-called "solar control" glazings) and/or to reduce the amount of energy dissipated to the outside (so-called "low-emission" glazings).

One type of stack of layers which is known to confer such properties to the substrates comprises at least one functional metallic layer having reflection properties in the infrared region and/or in the solar radiation region, in particular a layer based on silver or a silver-containing metal alloy.

This functional metallic layer is disposed between two dielectric coatings each comprising in general several layers which are each made of a dielectric material, of the metal nitride, metal oxide or metal oxynitride type. From an optical point of view, the purpose of these coatings that frame the metallic functional layer is to "anti-reflect" this metallic functional layer.

This stack is generally obtained by a sequence of depositions carried out by a technique which uses vacuum such as cathode sputtering optionally assisted by a magnetic field.

Two very thin metallic layers may also be provided on either side of the silver layer, the underlying layer as a bonding, nucleating layer, and the overlayer as a protective or "sacrificial" layer to prevent the silver from deteriorating if the overlying oxide layer is deposited by cathode sputtering in the presence of oxygen.

These metallic layers also have the function of protecting the functional layer during a possible high-temperature heat treatment, such as bending and/or tempering.

Stacks of low-emission thin layers with a single functional layer (hereinafter referred to by the expression "functional single-layer stack") or with two functional layers (hereinafter referred to by the expression "bi-functions layers stack") currently exist.

Patent EP-0 847 965 describes a stack with two silver layers ("bi-functional layers") designed to be able to undergo a heat treatment such as bending or tempering without significant optical changes, thanks to the use of oxygen barrier layers such as silicon nitride and layers that stabilize the silver layers.

Patent EP-0 844 219 also describes a stack with two silver layers of very different thicknesses, making it possible to obtain glazings with a solar factor lowered to at least 32%. Double glazings using this type of stack have light transmission of the order of 60 to 65%.

As a reminder, the solar factor (SF or "g") of a glazing is the ratio of the total solar energy entering the premises through this glazing to the total incident solar energy, and the selectivity corresponds to the ratio of the light transmission $LT_{vis}$ in the visible region of the glazing to the solar factor SF of the glazing and is such that: $s=LT_{vis}/SF$.

Depending on the climates of the countries where these glazings are to be installed, and in particular on the level of sunshine, the sought performances in terms of light transmission and solar factor may vary. Therefore, different ranges of glazings, characterized by their level of light transmission, are developed.

For example, in countries with high levels of sunshine, there is a strong demand for glazing with light transmission ($LT_{vis}$) of the order of 25 to 45% and sufficiently low solar factor (SF) values (15-25%).

In particular, it may be desirable to obtain glazings with a low LT without excessively increasing the light reflection (LR), while maintaining the energy reflection. In particular, a LR of less than 20% (or even less than 15%) is sought.

A person skilled in the art knows that they can insert into the stack, and more particularly into one (or more) dielectric coating(s), one (or more) layer(s) which absorb in the visible region.

It should be noted that the prior art has already disclosed the use of layers which absorb in the visible region in stacks with a plurality of functional layers, in particular patent EP 1 341 732 B1, which relates to the use of such layers which absorb in the visible region in a stack that is resistant to a heat treatment of the bending/tempering type. The absorbent layers are of the order of 1 to 3 nm. This stack aims to give the glazing high light transmission, of the order of 50 to 65%.

High selectivity should not be achieved at the expense of the aesthetic appearance and in particular the color. In general, it is sought to obtain the most neutral aesthetics possible, that is to say with indices a* and b* close to 0 or slightly negative, in external and internal reflection and in transmission.

The traditional approach to achieving both high selectivity and excellent color neutrality consists in developing increasingly sophisticated functional coatings.

The adaptation of the colorimetry of these glazings is obtained by playing with the nature, the thicknesses of the layers or coatings constituting the metallic and/or dielectric functional coatings.

The complexity of the coatings makes it difficult to obtain good thermal performance and excellent color neutrality at the same time.

This difficulty in achieving excellent color neutrality is even more pronounced for glazings with light transmission of the order of 25 to 75% because they are intrinsically more colored than glazings with higher or lower light transmission. Indeed, for very low or very high light transmissions for which the clarity is close to 0 or 100, color perception is less intense. The colors "converge" toward black and white.

Finally, the complexity of these coatings also makes it difficult to maintain consistent production quality for a given coating. Indeed, when multiplying the number of layers and of materials that constitute these coatings, it becomes increasingly difficult to adapt the settings of the deposition conditions in order to obtain coatings of identical color from two batches produced at the same production site or from two batches produced at two different production sites.

It is also required for the visual appearance of the glazings to barely change regardless of the angle of incidence with which the glazing is observed. It is therefore desirable for the reflected color, especially on the outside of the glazing, to be in acceptable colors, even when the observer looks at it with an angle of incidence of 45° or 60° to the normal. This means that the observer does not get an impression of significant inhomogeneity of hue or appearance, especially on high-rise buildings.

The aim of the invention is therefore to overcome the above-mentioned disadvantages by developing a glazing that offers both good thermal performance and the desired aesthetic appearance.

In particular, the aim of the invention is to develop a new type of functional bi-layer stack, the stack having low light transmission and a relatively neutral reflected color.

Another important aim is to propose a bi-functional layer stack which has high selectivity, while at the same time having an appropriate coloring, especially in the outside reflection of the glazing, in particular which is not in the red.

Another aim of the invention is for the reflected color, on the outside, to be stable even when the observer is at an angle of incidence away from the normal (perpendicular).

The invention thus relates, in its broadest meaning, to a substrate coated with a stack of thin layers forming a functional coating capable of acting on the infrared radiation and/or the solar radiation, said coating comprising two metallic functional layers (F), in particular based on silver, each disposed between two dielectric coatings (Di) so as to form the sequence of layers Di1/F1/Di2/F2/Di3, each dielectric coating (Di) comprising at least one layer of dielectric material, said functional coating comprising at least two absorbent layers (A1; A2) which absorb solar radiation in the visible part of the spectrum, which are disposed at least in two different dielectric coatings.

The absorbent layers (A1, A2) are separated from the metallic functional layers (F) by at least one dielectric layer, the geometric thickness of all the dielectric layers separating each absorbent layer from a metallic functional layer (F) is greater than or equal to 5 nm.

"Coating" within the meaning of the present invention should be understood as meaning that there may be just one layer or several layers of different materials inside the coating.

As usual, "dielectric layer" within the meaning of the present invention should be understood as meaning that, from the viewpoint of its nature, the material is "non-metallic", that is to say is not a metal. In the context of the invention, this term denotes a material exhibiting an n/k ratio that is equal to or greater than 5.

"Absorbent layer" within the meaning of the present invention should be understood as meaning that the layer is a material exhibiting an n/k ratio of between 0 and 5.

It is recalled that n denotes the real refractive index of the material at a given wavelength and k represents the imaginary part of the refractive index at a given wavelength; the n/k ratio being calculated at a given wavelength that is identical for n and for k, in the present application they are measured at 550 nm.

The functional coating can comprise at least one absorbent layer in the first dielectric coating (Di1).

The functional coating can comprise at least one absorbent layer in the second dielectric coating (Di2). The absorbent layer located in the second dielectric coating (Di2) can be surrounded, and in contact, on both sides, with layers of dielectric material chosen from silicon nitride-based and/or aluminum-based layers.

Preferably, a first absorbent layer (A1) is disposed in the first dielectric coating (Di1) and a second absorbent layer (A2) is disposed in the second dielectric coating (Di2).

Advantageously, in the stack of the coated substrate according to the invention, the two absorbent layers (A1 and A2) are separated from each metallic functional layer (F1 and F2) by at least one layer of dielectric material.

The absorbent layers (A1, A2) are separated from the silver-based functional layers by at least one dielectric layer, the geometric thickness of all the dielectric layers separating each absorbent layer from a silver-based functional layer is greater than 15 nm.

The absorbent layers (A1, A2) can be in contact with a layer of dielectric material preferably chosen from silicon nitride-based and/or aluminum-based layers.

The geometric thickness of the layer of dielectric material, preferably based on silicon nitride and/or aluminum, situated in contact with an absorbent layer (A1 and/or A2) can be:
greater than 15, greater than 20, greater than 25, greater than 30, greater than 35, greater than 40 nm, and/or
less than 100, less than 75, less than 60 nm, less than 50 nm.

When the stack includes an absorbent layer in the second dielectric coating, this absorbent layer can be surrounded and in contact, on one side or on both sides, with a layer of dielectric material. Preferably, the layer of dielectric material is chosen from silicon nitride-based and/or aluminum-based layers.

Preferably, the absorbent layer located in the second dielectric coating is surrounded on both sides by silicon nitride and/or aluminum based layers.

These embodiments correspond to the following stack:
a/A1/DO b/F1/Di2a/A2/Di2b/F2/Di3,
Di1/F1/Di2a/A1/Di2b/F2/Di3a/A2Di3b.

In the stack Di1a/A1/Di1b/F1/Di2a/A2/Di2b/F2/Di3 or in the stack Di1/F1/Di2a/A1/Di2b/F2/Di3a/A2/Di3b, the part under the absorbent layer of the second dielectric coating (Di2a) preferably has an optical thickness less than the optical thickness of the part of the dielectric coating (Di2b) located on the absorbent layer.

Advantageously, the absorbent layers are nitrided or metallic in nature. Advantageously, the absorbent layers (A1 and/or A2) are either metallic or nitrided, oxidized or oxynitrided in nature. In particular, the absorbent layers can be chosen from layers based on one of the following materials: NbN, TiN, NiCrN, SnZnN, ZrN, Ti, NiCr, Nb, Zr or a mixture thereof. This list is only provided as an example, since other types of absorber may be suitable for the present invention. The nature of the absorber is chosen as a function of aesthetic characteristics, material availability, energy performance, durability, constraints of the deposition equipment, etc.

The thickness of the absorbent layers should be adapted in particular as a function of the more or less absorbent nature of the chosen material. It is therefore advisable to multiply the value of the geometric thickness by a value that is indicative of the absorbent nature of the material. In the same way that the optical thickness of a layer can be defined from the product of its geometric thickness multiplied by its (real) optical index n, an "absorption thickness" can be defined by the geometric thickness multiplied by k/n, n being the real part of the optical index and k being the imaginary part of the optical index.

In particular, the absorption thickness (geometric thickness × k/n) of the assembly of both absorbent layers (A1 and A2) is comprised between 0.6 and 25 nm, preferably comprised between 0.8 and 15 nm and even more preferably comprised between 1 and 12 nm; the absorption thickness should be calculated taking into account all the absorbent layers of the stack. However, the blocking layers, directly in contact with the metallic functional layers, in view of their very small thickness, are not considered to be absorbent layers.

Advantageously, the ratio between the absorption thickness (geometric thickness X k/n) of the first absorbent layer to the absorption thickness of the second absorbent layer (A1/A2) is comprised between 0.5 and 5.0 preferably between 0.7 and 4.0 and more preferably between 0.9 and 2.5.

Conventionally, the light characteristics are measured according to illuminant D65 at 2° perpendicular to the material unless otherwise indicated.

The substrate of the invention has a light transmission (LT) is less than 60% preferably less than 50%. These light transmission values are measured directly on the substrate itself without it being configured as multiple or laminated glazing.

In the rest of the present application, all the energy and aesthetic performances of the coated substrate according to the invention are measured in a configuration:

Outside/6-mm-thick clear glass/stack/15-mm 90% Ar gap/6-mm-thick clear glass/Inside.

Particularly, the light transmission (LT) of the coated substrate, in the given glazing configuration, is comprised between 25 and 45%, preferably is comprised between 30 and 40%.

Particularly, the solar factor (g) of the coated substrate, in the given glazing configuration, is comprised between 15 and 30%, preferably between 17 and 26%.

Particularly, the selectivity (s) of the coated substrate, in the given configuration, is greater than 1.4, preferably greater than 1.5 and even more preferably greater than 1.6.

Particularly, the light reflection on the outside of the glazing ($LR_{ext}$), in the given configuration, is less than 20%, preferably less than 18%, and even more preferably less than 15%.

Particularly, in an "Outside/6-mm-thick clear glass/stack/15-mm 90% Ar gap/6-mm-thick clear glass/Inside" configuration, the colorimetric indices a* and b* of the Cielab measurement system, La*b*,
  measured in transmission, at normal incidence, are comprised between −12 and 2, and/or
  measured in reflection, on the outside, at normal incidence, are comprised between −12 and 2, preferably comprised between −10 and 1, even more preferably between −7 and 0,
  measured in reflection, on the outside, with an angle of incidence of 60° relative to the normal, are comprised between −10 and 2.

To avoid a greenish external reflection, the index a* and preferably higher than the index b* in reflection, on the outside.

The colorimetric index a* of the La*b* measurement system, measured in reflection, on the outside, at normal incidence, can in particular be comprised between −7 and 2. The colorimetric index b* of the La*b* measurement system, measured in reflection, on the outside, at normal incidence, can be comprised between −10 and 0.

When the angle of incidence of the observer is 45°, or 60° relative to the normal, it is desirable for the colorimetric indices a* and b* not to vary too much in relation to the indices measured at normal incidence.

The functional metallic layers on the basis of silver are made of silver or based on a silver-containing metal alloy.

Advantageously, the coating comprises a blocking layer (OB), preferably metallic, deposited on at least one of the two metallic functional layers (F). The coating can comprise a blocking metallic layer (OB) deposited on each metallic functional layer (F).

Advantageously, the coating comprises a blocking layer (UB), preferably metallic, deposited under at least one of the two metallic functional layers (F). The coating can comprise a blocking layer (UB), preferably metallic deposited under each metallic functional layer (F).

The blocking layers are chosen from metallic layers based on a metal or a metal alloy, metal nitride layers, metal oxide layers and metal oxynitride layers of one or more elements chosen from titanium, nickel, chromium, tantalum and niobium, such as Ti, TiN, TiOx, Nb, NbN, Ni, NiN, Cr, CrN, NiCr or NiCrN. The blocking metallic layers are preferably chosen from layers based on Ti, NiCr. They generally have a thickness of the order of 0.3 to 3 nm or 0.3 to 2 nm.

The blocking layers are in contact with the metallic functional layers (F).

In one particular embodiment, the dielectric coatings (Di) comprise a layer of nitride-based dielectric material (for example $Si_3N_4$) and a layer of oxide-based dielectric material (for example ZnO, SnZnO or ZnO:Al), the nitride-based layer being in contact with the absorbent layer. The nitride-based dielectric layer is preferably chosen from among silicon and/or aluminum nitride based layers.

The optical thickness of the dielectric coatings is generally comprised between 15 nm and 200 nm. If the dielectric coatings comprise several consecutive dielectric layers, the thicknesses are calculated for all the dielectric layers that form the dielectric coating.

When the second dielectric coating comprises an absorbent layer, the part under the absorbent layer preferably has an optical thickness that is less than the optical thickness of the part on the absorbent layer. In particular, the Di2b/Di2a ratio is comprised between 1.5 and 6, preferably between 1.8 and 5.

In particular, the optical thickness of the part under the absorbent layer, of the second dielectric coating is comprised between 15 and 120 nm, preferably between 25 and 100 nm. And the part above the absorbent layer has an optical thickness comprised between 80 and 200 nm, preferably comprised between 100 and 165 nm.

For the given thickness values, all the layers of dielectric material between the two metallic functional layers are taken into account; however, the thickness of the absorbent layer is not taken into account when calculating the optical thickness of the dielectric coating.

According to one particular embodiment, it is possible to provide a thin blocking metallic layer (UB) under at least one of the two metallic functional layers. These blocking layers generally have of the order of 0.3 to 2 nm.

The stack can also comprise an upper protective layer. The upper protective layer is preferably the final layer of the stack, that is to say the layer furthest from the substrate coated with the stack. These upper protective layers are not considered to be comprised in the last dielectric coating (Di3).

These layers generally have a thickness comprised between 2 and 10 nm, preferably between 2 and 5 nm.

The protective layer can be chosen from a layer of titanium, zirconium, hafnium, zinc and/or tin; this or these metals being in metal, oxide or nitride form. Advantageously, the protective layer is a layer of titanium oxide, a layer of tin and zinc oxide or a layer based on zirconium and titanium oxide.

The invention also relates to the use of a coated substrate as described above, in order to produce a double glazing.

Preferably, the stack according to the invention is positioned on side 2 of the glazing, i.e. on the inside face of the outer substrate, so as to form a structure of the type: glass/stack of thin layers/gap/glass.

Each substrate may be clear or colored. One of the substrates at least especially may be made of bulk-tinted glass. The choice of the type of coloring will depend on the level of light transmission and/or on the colorimetric appearance desired for the glazing once the manufacture thereof is complete.

The substrates of the glazings according to the invention are capable of undergoing a heat treatment. They are thus optionally bent and/or tempered.

The following non-limiting examples illustrate the details and advantageous features of the invention.

EXAMPLES

Example 1

Table 1 below shows the geometric thicknesses in nanometers of each of the layers of stacks produced for the comparative examples (C1 to C4) and according to the invention (Examples 1a to 1h). The stacks produced seek to achieve an LT of the order of 30%.

Comparative example C1 is similar to the stacks according to the invention but does not comprise an absorbent layer.

Comparative examples C2, C3 and C4 comprise a single absorbent layer, in the $1^{st}$, $2^{nd}$ and $3^{rd}$ dielectric coating, respectively.

Different types of absorbent layer were chosen: In examples C1 to C4 and a, b and c, the two absorbent layers are made of NbN (k=1.8; n=3.5). In example d, the absorbent layers are made of NiCrN (k=3.3; n=3.1); in example e, of Ti (k=2.7; n=3.1); in example f, of TiN (k=1.6; n=1.8); in example g, of Nb (k=1.4; n=4.4); in example h, of SnZnN (k=1.9; n=3.3).

TABLE 1

| Ex1 | Stack (nm) | C1 | C2 | c3 | C4 | 1a | 1b | 1c | 1d | 1e | 1f | 1g | 1h |
|---|---|---|---|---|---|---|---|---|---|---|---|---|---|
| | TiO₂ | 3 | 3 | 3 | 3 | 3 | 3 | 3 | 3 | 3 | 3 | 3 | 3 |
| Di3 | SiN | 21 | 35 | 29 | 17 | 27 | 22 | 22 | 28 | 30 | 29 | 30 | 32 |
| | Absorbing | 0 | 0 | 0 | 5.4 | 0 | 3.3 | 2.5 | 0 | 0 | 0 | 0 | 0 |
| | ZnO | 5 | 5 | 5 | 5 | 5 | 5 | 5 | 5 | 5 | 5 | 5 | 5 |
| OB2 | NiCr | 1.5 | 2 | 1.5 | 0.5 | 0.5 | 0.5 | 0.5 | 1.7 | 1.9 | 1.2 | 1.9 | 2 |
| F2 | Ag | 8 | 8.4 | 10.2 | 8 | 10.9 | 13.3 | 10.4 | 11.3 | 10.4 | 11.7 | 10.4 | 11.2 |
| UB2 | NiCr | 3 | 2.5 | 0.5 | 1 | 3 | 1.5 | 0.5 | 0.3 | 0.9 | 0.5 | 0.9 | 0.8 |
| Di2 | ZnO | 5 | 5 | 5 | 5 | 5 | 5 | 5 | 5 | 5 | 5 | 5 | 5 |
| | SnZnO | 15 | 15 | 15 | 15 | 15 | 15 | 15 | 35 | 31 | 27 | 31 | 33 |
| | SiN | 32 | 39 | 26 | 30 | 44 | 44 | 37 | 28 | 16 | 24 | 16 | 28 |
| | Absorbing | 0 | 0 | 3.7 | 0 | 3 | 0 | 5.1 | 2.6 | 2.2 | 7.7 | 2.2 | 2.9 |
| | SiN | 33 | 33 | 37 | 25 | 16 | 22 | 14 | 22 | 22 | 32 | 22 | 16 |
| | ZnO | 5 | 5 | 5 | 5 | 5 | 5 | 5 | 5 | 5 | 5 | 5 | 5 |
| OB1 | NiCr | 2.5 | 2.5 | 2.5 | 2.5 | 1.5 | 2.5 | 0.3 | 1.1 | 1.8 | 1.5 | 1.8 | 0.3 |
| F1 | Ag | 12.3 | 11.1 | 8 | 12.1 | 11.7 | 8.9 | 10.7 | 8.3 | 12.0 | 8 | 12.0 | 14 |
| UB1 | NiCr | 2 | 1.5 | 2 | 0.5 | 0.5 | 0.5 | 2 | 0.3 | 1.5 | 1.0 | 1.5 | 1.3 |
| Di1 | ZnO | 5 | 5 | 5 | 5 | 5 | 5 | 5 | 5 | 5 | 5 | 5 | 5 |
| | Absorbing | 0 | 4.5 | 0 | 0 | 3 | 4.5 | 0 | 3.2 | 1.5 | 5.5 | 1.5 | 3.1 |
| | SiN | 27 | 15 | 42 | 58 | 41 | 38 | 39 | 46 | 36 | 40 | 36 | 33 |

Table 2 below summarizes the main optical and energetic characteristics obtained in a configuration:

Outside/6-mm-thick clear glass/stack/15-mm 90% Ar gap/6-mm-thick clear glass/Inside.

TABLE 2

Configuration 6 mm Indian PLX/15 mm 90 Ag/6 mm Indian PLX

| Ex1 | S | g | LT | a* t | b* t | Rc | a*c | b*c | Rg | a*g | b*g | a*60 | b*60 |
|---|---|---|---|---|---|---|---|---|---|---|---|---|---|
| C1 | 1.54 | 19.5 | 30.1 | −5 | −7 | 26 | −18 | −12 | 21 | −6 | −4 | 2 | −13 |
| C2 | 1.59 | 19.5 | 31.1 | −10 | −2 | 18.5 | −8 | −6 | 17 | −3 | −3 | −5 | −3 |
| C3 | 1.44 | 19.5 | 28 | −5 | −2 | 15 | −2 | 3 | 18 | 1 | −6 | −3 | −8 |
| C4 | 1.43 | 19.6 | 28 | −4 | −6 | 26 | −18 | −15 | 18.5 | 5 | −2 | 7 | −2 |
| 1a | 1.59 | 18.2 | 29 | −5 | 0 | 12 | −4 | −1 | 13 | −1 | −4 | −2.5 | −6 |
| 1b | 1.63 | 19.5 | 31 | −10 | −2 | 18 | −10 | −6 | 9 | −3.5 | −6 | −4.5 | −7 |
| 1c | 1.44 | 19.5 | 28 | −4 | 0 | 13 | −3 | 4 | 16 | 0 | −4 | 1 | −7 |
| 1d | 1.48 | 19.3 | 28.5 | −4 | −1 | 12.3 | −2 | −4 | 12.7 | −0.6 | −5.5 | −3.5 | −6.5 |
| 1e | 1.5 | 19.3 | 29 | −4 | −1 | 12 | −2 | −4 | 13 | −0.5 | −5.1 | −3.5 | −6.5 |
| 1f | 1.66 | 19.3 | 32 | −6 | −1 | 12 | −5.8 | −4 | 12.9 | −0.5 | −4.2 | −2 | −6.5 |
| 1g | 1.6 | 19.5 | 30.8 | −5.4 | −1 | 12 | −2.1 | −1.3 | 13 | −0.6 | −3.6 | −0.6 | −6.1 |
| 1h | 1.53 | 19.5 | 29.8 | −4 | −1 | 12.1 | −2 | −4 | 13 | −0.5 | −5.5 | −3.3 | −5.9 |

Example 2

Table 3 below shows the geometric thicknesses in nanometers of each of the layers of stacks produced for the comparative examples (C1 to C4) and according to the invention (Examples 2a to 2h). The stacks produced seek to achieve an LT of the order of 40%.

Comparative example C1 is similar to the stacks according to the invention but does not comprise an absorbent layer.

Comparative examples C2, C3 and C4 comprise a single absorbent layer, in the $1^{st}$, $2^{nd}$ and $3^{rd}$ dielectric coating, respectively.

Different types of absorbent layer were chosen: In examples C1 to C4 and a, b and c, the two absorbent layers are made of NbN (k=1.8; n=3.5). In example d, the absorbent layers are made of NiCrN (k=3.3; n=3.1); in example e, of Ti (k=2.7; n=3.1); in example f, of TiN (k=1.6; n=1.8); in example g, of Nb (k=1.4; n=4.4); in example h, of SnZnN (k=1.9; n=3.3).

TABLE 3

| Ex2 | Stack (nm) | C1 | C2 | c3 | C4 | 2a | 2b | 2c | 2d | 2e | 2f | 2g | 2h |
|---|---|---|---|---|---|---|---|---|---|---|---|---|---|
| | TiO₂ | 3 | 3 | 3 | 3 | 3 | 3 | 3 | 3 | 3 | 3 | 3 | 3 |
| Di3 | SiN | 33 | 35 | 31 | 16 | 31 | 25 | 28 | 28 | 27 | 31 | 29 | 33 |
| | NbN | 0 | 0 | 0 | 3.5 | 0 | 3.2 | 1 | 0 | 0 | 0 | 0 | 0 |
| | ZnO | 5 | 5 | 5 | 5 | 5 | 5 | 5 | 5 | 5 | 5 | 5 | 5 |
| OB2 | NiCr | 0.8 | 1 | 0.5 | 0.5 | 0.5 | 0.5 | 0.5 | 1.3 | 1.4 | 0.9 | 1.1 | 1.9 |
| F2 | Ag | 12 | 11.1 | 9.8 | 10.1 | 11.6 | 13.5 | 10.1 | 11.7 | 10.9 | 12.1 | 10.9 | 11.9 |
| UB2 | NiCr | 0.5 | 0.5 | 0.5 | 0.5 | 0.6 | 0.5 | 0.5 | 0.3 | 0.3 | 0.3 | 0.6 | 0.3 |
| Di2 | ZnO | 5 | 5 | 5 | 5 | 5 | 5 | 5 | 5 | 5 | 5 | 5 | 5 |
| | SnZnO | 15 | 15 | 15 | 15 | 15 | 15 | 15 | 34 | 34 | 34 | 34 | 35 |
| | SiN | 38 | 40 | 43 | 31 | 48 | 46 | 45 | 23 | 27 | 22 | 30 | 15 |
| | NbN | 0 | 0 | 4.5 | 0 | 2.5 | 0 | 4.5 | 1.4 | 1.5 | 4.6 | 2.0 | 1.5 |
| | SiN | 30 | 26 | 10 | 27 | 14 | 20 | 10 | 26 | 11 | 23 | 10 | 27 |
| | ZnO | 5 | 5 | 5 | 5 | 5 | 5 | 5 | 5 | 5 | 5 | 5 | 5 |
| OB1 | NiCr | 2.3 | 0.9 | 0.6 | 1.1 | 0.8 | 0.3 | 0.4 | 0.3 | 1.4 | 1.0 | 1.8 | 0.8 |
| f1 | Ag | 12.5 | 13.1 | 8.6 | 8 | 13.1 | 9.6 | 10.5 | 8 | 10.3 | 9.7 | 9.2 | 14.0 |
| UB1 | NiCr | 2 | 0.5 | 2 | 1.6 | 0.5 | 0.5 | 0.9 | 0.3 | 1.1 | 0.7 | 1.2 | 0.3 |
| Di1 | ZnO | 5 | 5 | 5 | 5 | 5 | 5 | 5 | 5 | 5 | 5 | 5 | 5 |
| | NbN | 0 | 5 | 0 | 0 | 2.5 | 3.8 | 0 | 3.0 | 3.1 | 4.7 | 2.4 | 2.6 |
| | SiN | 31 | 15 | 45 | 33 | 36 | 35 | 40 | 46 | 43 | 36 | 43 | 25 |

Table 4 below summarizes the main optical and energetic characteristics obtained in the same configuration:

Outside/6-mm-thick clear glass/stack/15-mm-thick 90% Ar/6-mm-thick clear glass/Inside.

TABLE 4

| | Configuration 6 mm Indian PLX/15 mm 90 Ag/6 mm Indian PLX | | | | | | | | | | | | |
|---|---|---|---|---|---|---|---|---|---|---|---|---|---|
| Ex2 | S | g | LT | a*t | b*t | Rc | a*c | b*c | Rg | a*g | b*g | a*60 | b*60 |
| C1 | 1.67 | 25.2 | 42 | −8 | −2 | 16.8 | −12 | −8 | 20 | 2 | −8 | −6 | −7 |
| C2 | 1.62 | 26 | 42 | −9 | −1.5 | 13.5 | −5 | −7 | 12 | −1.5 | −4.5 | −5 | −4 |
| C3 | 1.48 | 26 | 38.5 | −5 | 0 | 10 | −2 | 0 | 15 | 0 | −3.5 | −2 | −6 |
| C4 | 1.48 | 26 | 38.5 | −8 | −3 | 10 | −10 | −8 | 8 | −5 | −2 | 2 | −8 |
| 2a | 1.61 | 24.9 | 40 | −5.5 | 0 | 10 | −4 | −2 | 11 | −1 | −4 | −2.5 | −5.5 |
| 2b | 1.58 | 26 | 41 | −8 | 0 | 14 | −10 | 3 | 10 | −3 | −3 | −3.5 | −5 |
| 2c | 1.51 | 25.5 | 38.5 | −5 | 0 | 10 | −3 | 3 | 14 | 1 | −3 | −1.5 | −8 |
| 2d | 1.5 | 25.7 | 38.5 | −3.5 | −1.3 | 12.7 | −2 | −5 | 10.2 | 0 | −5 | −3.7 | −6.6 |
| 2e | 1.59 | 25.5 | 40.5 | −5 | 0 | 12 | −2 | −5 | 10 | −0.5 | −3.9 | −3.1 | −5.6 |
| 2f | 1.68 | 25 | 42 | −5 | −1 | 11.7 | −5 | −5 | 13 | −0.5 | −3.5 | −3.5 | −6.3 |
| 2g | 1.58 | 25 | 39.6 | −4.3 | 0.7 | 11.1 | −2.1 | −5 | 10 | −0.5 | −5.3 | −3.5 | −6.5 |
| 2h | 1.6 | 24 | 38.5 | −4 | −1 | 12 | −2.6 | −5 | 13 | −0.5 | −5.5 | −3.1 | −6.5 |

In conclusion, it can be seen that the examples according to the invention make it possible to produce double glazings with a light transmission of the order of 30% and 40% while combining low solar factors (g less than or equal to 26% when the LT is of the order of 40% and g less than 20% when the LT is 30%) and low light reflections ($LR_{ext}$ less than 20%), all while providing the sought aesthetics.

The comparative examples do not allow for a combination of all the sought criteria.

What is particularly remarkable is that it was possible to maintain the color reflected to the outside in the neutral zones, which is not the case in the comparative examples. It can be seen, moreover, that

- in example 1, the transmitted color is too greenish in comparative example V2 and the color reflected to the outside is reddish in comparative example V4.
- in example 2, V4, the index a* is lower than the index b*, which gives an excessively greenish shade and the transmitted color is too greenish in comparative examples V2 and V4.

The angular stability of the color reflected to the outside is noticeably improved compared to the stacks from the comparative examples.

The present invention is described in the description hereinabove by way of example. It goes without saying that those skilled in the art are capable of implementing other variants of the invention without however straying from the scope of the patent such as defined by the claims.

The invention claimed is:

1. A substrate coated with a stack of thin layers forming a functional coating which is constructed and arranged to act on solar radiation and/or infrared radiation, said functional coating comprising:
   - two metallic functional layers comprising silver, each disposed between two dielectric material based coatings that each have a total thickness that is predominantly attributed to one or more dielectric materials, so as to comprise at least the sequence of layers—first dielectric material based coating Di1/first metallic functional layer F1/second dielectric material based coating Di2/second metallic functional layer F2/third dielectric material based coating Di3-starting from the substrate, each dielectric material based coating comprising at least one layer of dielectric material,
   - at least two absorbent layers, each of which absorbs in the visible region, wherein each of the at least two absorbent layers is respectively selected from a layer consisting of a material selected from the group consisting of NbN, TiN, NiCrN, SnZnN, ZrN, Ti, NiCr, Nb and a mixture thereof, each absorbent layer of the at least two absorbent layers being disposed in a different dielectric material based coating, wherein a first absorbent layer of the at least two absorbent layers is displosed in the first dielectric material based coating Di1 and a second absorbent layer of the at least two absorbent layers is disposed in the second dielectric material based coating Di2,
   - wherein each absorbent layer is separated from each of the two metallic functional layers by at least one dielectric layer, and wherein a geometric thickness of all dielectric layers separating each absorbent layer from each metallic functional layer is greater than or equal to 5 nm, and
   - wherein a geometric thickness of the first absorbent layer is greater than a geometric thickness of the second absorbent layer.

2. The coated substrate according to claim 1, wherein the second absorbent layer located in the second dielectric material based coating Di2 is surrounded on both sides and in contact with layers of dielectric material chosen from silicon and/or aluminum nitride based layers.

3. The coated substrate according to claim 1, wherein the stack comprises dielectric coating Di1a/first absorbent layer A1/dielectric coating Di1b/first metallic functional layer F1/dielectric coating Di2a/second absorbent layer A2/dielectric coating Di2b/second metallic functional layer F2/dielectric coating Di3, wherein the dielectric coating Di2a located under the second absorbent layer A2 has an optical thickness that is less than an optical thickness of dielectric coating Di2b located on the second absorbent layer A2.

4. The coated substrate according to claim 1, wherein the coated substrate exhibits a light transmission of less than 60%.

5. The coated substrate according to claim 1, wherein, in an Outside/6-mm-thick clear glass/stack/15-mm 90% Ar gap/6-mm-thick clear glass/Inside configuration, a light transmission is comprised between 25 and 45%.

6. The coated substrate according to claim 1, wherein the coated substrate exhibits, in an Outside/6-mm-thick clear glass/stack/15-mm 90% Ar gap/6-mm-thick clear glass/Inside configuration, a selectivity greater than 1.4.

7. The coated substrate according to claim 1, wherein the uncoated face of the substrate is intended to form the outside of a glazing, a light reflection on an outside, in an Outside/6-mm-thick clear glass/stack/15-mm 90% Ar gap/6-mm-thick clear glass/Inside configuration, being less than 20%.

8. The coated substrate according to claim 1, wherein the functional coating comprises a metallic blocking layer deposited on at least one of the two metallic functional layers.

9. The coated substrate according to claim 1, wherein the functional coating comprises a blocking metallic layer deposited under at least one of the two metallic functional layers.

10. The coated substrate according to claim 1, the two dielectric coatings comprise at least one layer of nitride-based dielectric material and at least one layer of oxide-based dielectric material, the nitride-based layer being in contact with the absorbent layer.

11. A double glazing comprising two transparent substrates, wherein a transparent substrate forming an outer pane of the glazing is a substrate according to claim 1.

12. The coated substrate according to claim 4, wherein the light transmission is less than 50%.

13. The coated substrate according to claim 1, wherein the coated substrate exhibits a light transmission between 25% and 60%.

14. The coated substrate according to claim 1, wherein a ratio between an absorption thickness of the first absorbent layer to an absorption thickness of the second absorbent layer is greater than 1 and lower than equal to 5.0, wherein the absorption thickness of a layer is defined as $X*(k/n)$, wherein X is a geometric thickness of the layer, n is the real part of an optical index of the layer and k is the imaginary part of the optical index of the layer.

15. The coated substrate according to claim 1, wherein a total part of the second dielectric material based coating Di2 under the second absorbent layer has an optical thickness less than an optical thickness of a total part of the second dielectric coating (Di2b) located on the second absorbent layer.

* * * * *